Fig. 1a

INVENTORS
STANLEY G. FROYD,
KEITH L. STILES
BY
ATTORNEYS.

United States Patent Office 3,416,057
Patented Dec. 10, 1968

3,416,057
A.C. MOTOR SPEED CONTROL SYSTEM USING SELECTED VOLTAGE LEVELS INVERTED AT SELECTED FREQUENCIES AND METHOD
Stanley G. Froyd, South Pasadena, and Keith L. Stiles, Pasadena, Calif., assignors to Gaylord-Rives Company, Pasadena, Calif., a corporation of California
Filed Apr. 6, 1966, Ser. No. 540,569
15 Claims. (Cl. 318—227)

ABSTRACT OF THE DISCLOSURE

This disclosure relates to a method and apparatus for controlling the speed of an A.C. motor.

A control system according to the present disclosure includes a source of potential having a plurality of levels of potential and a source of variable frequency pulsating current, each frequency being respective to an individual level of the source of potential. Selection means is provided for concurrently selecting one of the levels of potential and a respective frequency of pulsating current. Inverter means is provided to invert the selected level of potential at a frequency dependent upon the selected frequency of the source of pulsating current. The inverter means is adapted to be connected to the windings of an A.C. motor.

According to the method of the present disclosure, a level of potential is selected from a plurality of different levels of potential and a frequency is selected from one of a plurality of different frequencies. The selected level of potential is inverted at a frequency dependent upon the selected frequency to obtain a resultant signal, and the resultant signal is impressed upon the winding of an A.C. motor.

---

This invention relates to a method and apparatus for controlling the speed of an A.C. motor, for example a synchronous or an induction motor.

Controls for A.C. motors have commonly accomplished their function in several ways. One well-known technique is to physically brake the motor to slow it down. This causes the motor to be overloaded and drastically reduces the available torque, and hence, reduces the efficiency of the motor. Another technique is to change the frequency of the current through the motor winding. However, since the driving voltage is kept at a constant level, serious damage can occur to the motor winding due to an over-current condition when the frequency is lowered, and a serious loss in efficiency of the motor is observed.

To maintain high torque and efficiency when altering the speed of a synchronous motor, not only should the frequency of the driving current into the motor winding be changed, but also the voltage across the winding. Thus, when the speed of rotation is increased, not only should the frequency of the driving current be increased, but the voltage of the driving current should likewise be increased to maintain peak torque and efficiency.

An object of the present invention is to provide a control system for selectively controlling the speed of rotation of an A.C. motor, such as a synchronous or induction motor, by adjustably varying both the frequency and voltage of the driving current through the motor winding.

Prior control systems, in addition to lacking the selectivity of driving voltage, further lack an adequate control over the direction the motor takes when it starts. Usually it is random, and often the initial direction is wrong.

In situations where the motor is a multi-phase motor, the direction of shaft rotation is determined by one phase leading or lagging another phase. The prior control systems lack an adequate control over insuring the proper phase sequence.

Therefore it is an optional but desirable object of the present invention to provide positive control over the direction of shaft rotation, so that it is initially reliable and determinable by a discrete switch setting. This control not only insures positive selection of the direction of shaft rotation, but also provides for reversing the direction without reconnecting the motor or without an intricate switching system.

The apparatus of the present invention generally comprises a control for providing a plurality of selectable speeds for an A.C. motor. A source of direct current is provided having a plurality of selectable potential levels, each being different from the other levels, and a plurality of sources of pulsating current, each being at a different frequency. Means is provided for concurrently selecting one of the plurality of sources of potential and a respective source of pulsating current. An inverter is provided for each phase for alternating the selected source of potential at a frequency dependent upon the frequency of the selected one of said sources of the pulsating current. The output from this inverter thus provides both frequency and voltage selection for the motor winding.

Additionally, the apparatus is provided with means for selectively reversing the phases so that one phase will either lead or lag the other phase as desired. This feature insures proper direction of shaft rotation, and allows reversing the direction if desired.

According to the method of the present invention, a source of potential is selected from a plurality of sources of different potential and a corresponding source of pulsating current is selected from a plurality of sources of pulsating current having different frequencies. A first pair of pulsating signals which are 180° out of phase are derived from the source of pulsating current. A second pair of pulsating signals is derived from one of said first pair of pulsating signals, and are 180° out of phase and being at one-half the frequency of the one signal of the first pair of pulsating signals, and a third pair of pulsating signals is derived from the other of said first pair of pulsating signals and being 180° out of phase and at one-half the frequency of the other of said first pair of pulsating signals. A first alternating current is derived from the second pair of pulsating signals, and a second alternating current, 90° out of phase from said first alternating current, is derived from the third pair of pulsating signals. The selected source of potential is then alternated separately by each of said first and second alternating currents to obtain two respective resultant signals. These respective resultant signals are then impressed upon respective windings of the motor. According to a preferred but optional feature of this invention, the circuitry and method includes means selectively controlling whether said first alternating current leads or lags said second alternating current.

The above and other features of this invention will be fully understood from the following detailed description and the accompanying drawings, in which.

Figure 1A:
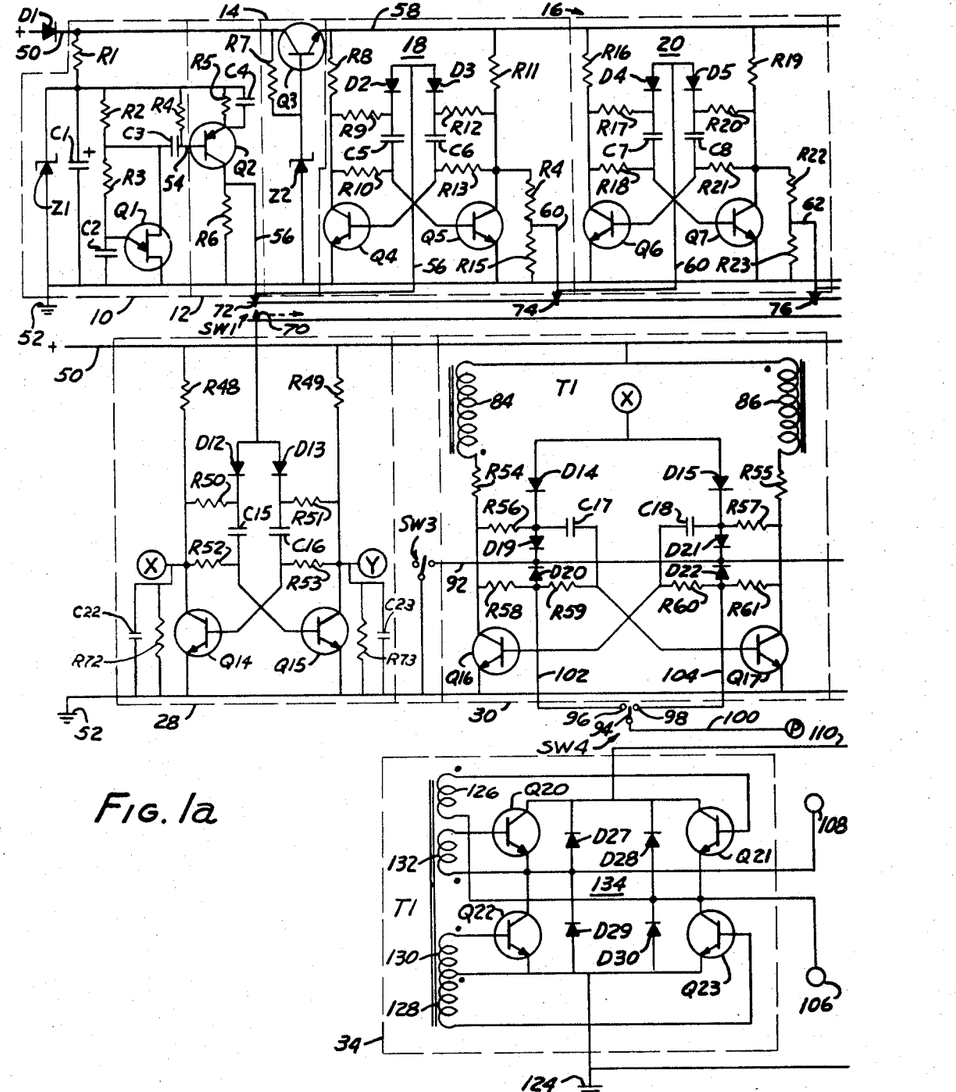
FIGS. 1a and 1b show a composite circuit diagram according to the presently preferred embodiment of the invention.
Figure 1B:
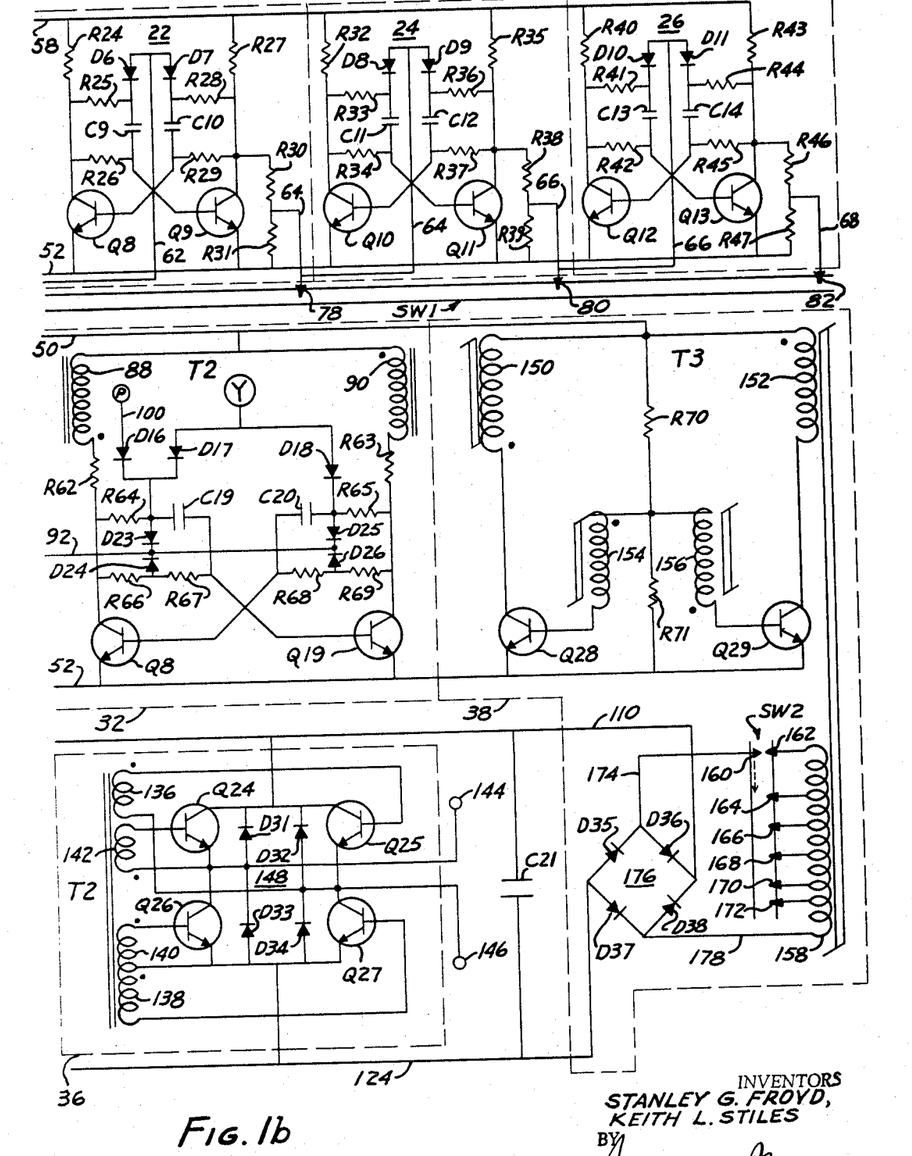

FIG. 1 illustrates a relaxation oscillator 10, a buffer stage 12, a voltage regulator 14, and a five-stage frequency divider 16 comprising flip-flops 18, 20, 22, 24 and 26. Each flip-flop 18–26, sometimes hereinafter referred to as multivibrator, is of a bi-stable nature. A switch SW1 serves to select the output from the frequency divider and place a signal to the input of a phase-shift device 28. Phase-shift device 28 is essentially a bi-stable flip-flop, sometimes hereinafter referred to as multivibrator, and has two outputs. A first output of the phase-shift device is impressed upon the input of a first output stage driver 30, while the second output of the phase-shift device is impressed on an input of a second output stage driver 32. The first phase of the motor is driven by a first full-phase driver 34 (sometimes hereinafter called an "inverter") which receives its input from the first output stage driver 30 through a transformer T1, while the second phase of the motor is driven by a second full-phase driver 36 (sometimes hereinafter called an "inverter") which receives its input from the second output stage driver 32 through a second transformer T2. Voltage selection for the full-phase drivers is provided by a DC-to-DC converter 38.

Speed selection for the motor is done by changing the frequency on each phase of the motor windings. Complications arise by simply changing that frequency, so the voltage across each winding of the motor is changed in a substantially linear proportion with the change of frequency. The DC-to-DC converter, along with switch SW2, provides this latter function.

Power is supplied through a DC battery or any other source of DC potential. Although it is shownn separately in the drawings for sake of convenience, the same DC supply may be used for driving the oscillator 10, frequency divider 16, phase-shift device 28, output stage drivers 30 and 32 and DC-to-DC converter 38. The supply is provided through diode D1 to a positive lead 50 and a ground 52. Diode D1 serves to protect against reverse polarity connection. Voltage for the oscillator is supplied through resistor R1. Zener diode Z1 and capacitor C1 serve to regulate and stabilize the voltage to the relation oscillator. Thus with a stabilizer voltage input to the relaxation oscillator the frequency of oscillations of said oscillator will remain stable.

Figure 6:
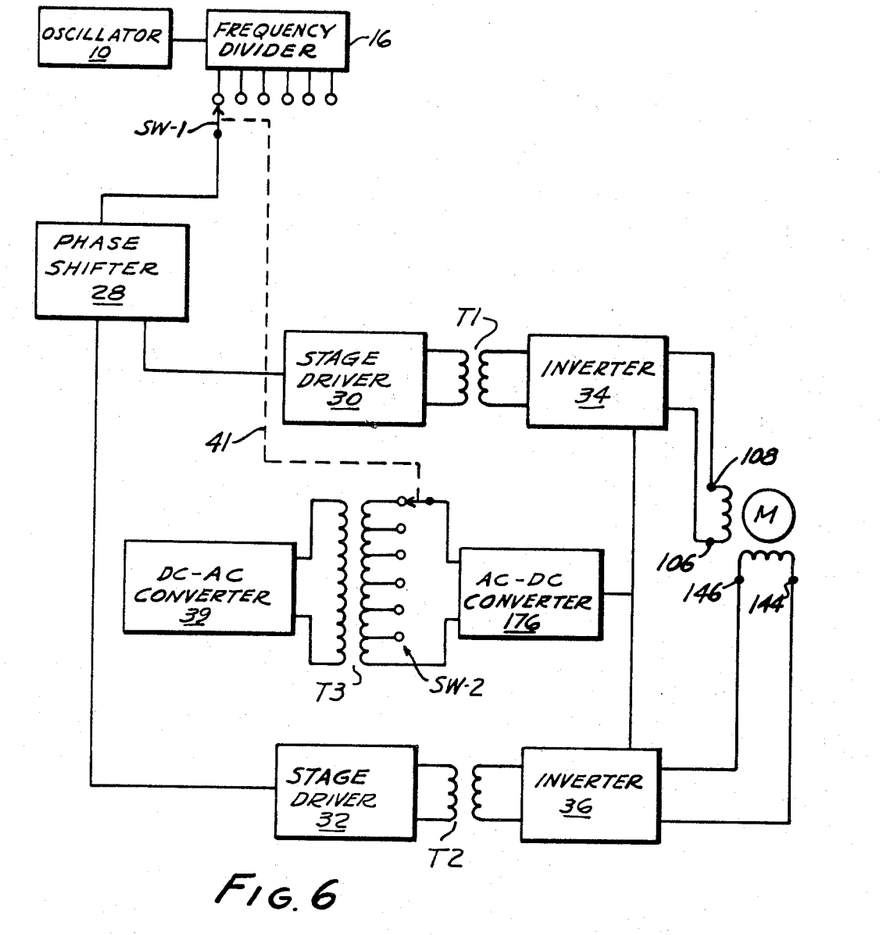
FIG. 6 is a block diagram of the circuit illustrated in FIGS. 1a and 1b.

FIG. 6 illustrates a block diagram of the circuit illustrated in FIG. 1. Oscillator 10 drives frequency divider 16 and the movable contact of switch SW1 mates with one of the stationary contacts connected to frequency divider 16 to select a frequency for driving phase shift device 28. Phase shift device 28 provides a first output to the first output stage driver 30 and a second output, 180° out of phase from the first output, to the second output stage driver 32. Output stage driver 30 is connected by means of transformer T1 to inverter 34 while output stage driver 32 is connected by means of transformer T2 to inverter 36.

The D.C.-to-D.C. converter 38 illustrated in FIG. 1 comprises D.C.-to-A.C. converter 39 having its output connected to the primary of transformer T3. The secondary of transformer T3 is connected to a plurality of contacts of switch SW2, the movable contact thereof being connected to the input of A.C.-to-D.C. converter 176. The output of A.C.-to-D.C. converter 176 is connected to inverters 34 and 36. The movable contacts of switches SW1 and SW2 are prefarably mechanically linked by linkage 41 so that movement of one contact will cause movement of the other.

Inverters 34 and 36 alternate the D.C. potential provided by the output of A.C.-to-D.C. converter 176 at a frequency dependent upon the frequency of the signals provided by the respective output stage drivers. The outputs of inverter 34 and 36 are connected to terminals 106, 108, 144 and 146 for driving motor M.

Relaxation oscillator 10 comprises a resistor R2, a second resistor R3 and a capacitor C2 placed in series across capacitor C1. A unijunction transistor Q1 is shown placed in parallel with resistor R3 and capacitor C2. The control electrode of the unijunction transistor Q1 is connected to the junction of the resistor R3 and capacitor C2. The frequency of oscillations of the relaxation oscillator is determined by the R-C time constant determined by resistor R3 and capacitor C2. To further stabilize the frequency against the effect of temperature variations, resistor R3 may be a temperature compensating resistor. Variations in the R-C time constant would produce a range of frequencies available from the oscillator 10. A resistor R4 and capacitor C3 are shown serially connected across resistor R2. A lead 54 is shown connecting the junction between resistor R4 and capacitor C3 to the base of PNP transistor Q2 of the buffer stage 12. The emitter of transistor Q2 is shown connected in the junction between resistor R1 and capacitor C1 through the parallel combination of resistor R5 and capacitor C4. The collector of transistor Q2 is connected to ground through resistor R6. The output of the buffer stage is connected to the collector of transistor Q2 by lead 56.

Lead 56 is connected to the input of the first flip-flop 18 of the frequency divider 16. Thus, the relaxation oscillator 10 and buffer stage 12 serve to provide a source of constant positive pulses to the frequency divider 16. A constant voltage for the frequency divider is provided by voltage regulator 14.

Series voltage regulator 14 comprises an NPN transistor Q3 having its collector connected to diode D1 and having its emitter connected to the output lead 58. A resistor R7 is connected between the collector and the base, and the base is connected through Zener diode Z2 to ground. Thus voltage regulator 14 provides voltage regulation for the frequency divider.

The frequency divider comprises several stages of bistable flip-flop 18 through 26. Although shown as having five stages, frequency divider 16 may have any number of stages that is desirable, and five stages are illustrated as exemplary. Since each flip-flop is essentially the same, only the details of flip-flop 18 will be described in detail.

Flip-flop comprises a first NPN transistor Q4 having its emitter connected to ground 52 and its collector connected through resistor R8 to the output lead 58 of the voltage regulator 14. Resistors R9 and R10 are connected to the junction between the collector of transistor Q4 and resistor R8, and a capacitor C5 is connected between the opposite ends of resistors R9 and R10. A second NPN transistor Q5 is shown having its emitter connected to ground 52 and its collector connected through resistor R11 to the regulated voltage lead 58. Resistors R12 and R13 are shown connected to the junction between resistor R11 and the collector of transistor Q5, with their opposite ends connected to opposite sides of capacitor C6. The base of transistor Q4 is connected to the junction between capacitor C6 and resistor R13, while the base of transistor Q5 is connected to the junction between capacitor C5 and resistor R10. The input from the buffer 12 on line 56 is shown connected to the junction betewen resistor R9 and capacitor C5 through diode D2 and to the junction between resistor R12 and capacitor C6 through diode D3. Resistors R14 and R15 are shown serially connected across the collector-emitter circuit of transistor Q5. The output of flip-flop 18 is taken on lead 60, which is connected to the junction between resistors R14 and R15.

Assuming that transistor Q5 is in its on, or conducting, condition, the entire regulated voltage is reflected across load resistor R11. Since the collector Q5 is essentially at ground, there is essentially no voltage drop across resistors R14 or R15, and the potential on line 60 is essentially zero. Under these conditions capacitor C6 is in an uncharged condition, thus holding transistor Q4 in an off, or non-conducting, condition. Thus, since the regulated voltage appears entirely across the collector-emitter circuits of transistor Q4, the base of transistor Q5 is biased to retain its on, or conducting, condition.

A positive pulse on line 56 from the buffer 12 is reflected through diode D3 to charge capacitor C6. Under these conditions transistor Q4 is biased to its on, or conducting, condition, and transistor Q5 assumes the opposite state. With transistor Q5 in the off condition, the entire regulated voltage now appears across the serial connection of resistors R11, R14 and R15. Thus the output on line 60 rises to a positive potential. Upon the next positive pulse appearing on line 56 from the buffer 12, the transistors in flip-flop 18 assume again the opposite state. Thus, for every two positive pulses appearing on line 56, a single positive pulse will appear in line 60. In this manner the frequency has been divided in half.

Flip-flop 20 is constructed in a similar manner as flip-flop 18 and comprises a pair of NPN transistors Q6 and Q7, capacitors C7 and C8, diodes D4 and D5 and resistors R16 through R23; flip-flop 22 comprises NPN transistors Q8 and Q9, capacitors C9 and C10, diodes D6 and D7 and resistors R24 through R31; flip-flop 24 comprises a pair of NPN transistors Q10 and Q11, capacitors C11 and C12, diodes D8 and D9 and resistors R32 through R39; and flip-flop 26 comprises a pair of NPN transistors Q12 and Q13, capacitors C13 and C14, diodes D10 and D11 and resistors R40 through R47. The output lines 60 from flip-flop 18 is connected to the input at the junction between diodes D4 and D5 in flip-flop 20; the output of flip-flop 20 is taken from the junction between resistors R22 and R23 by line 62 and connected to the input of flip-flop 22 at the junction between diodes D6 and D7; the output of flip-flop 22 is taken by lead 64 connected to the junction between resistors R30 and R31 and connected to the input of flip-flop 24 at the junction between diodes D8 and D9; the output of flip-flop 24 is taken by lead 66 from the junction between resistors R38 and R39 and is connected to the input of flip-flop 26 at the junction between diodes D10 and D11; and the output of flip-flop 26 is taken by line 68 from the junction between resistors R46 and R47. The frequency of positive pulses on line 60 is one-half that of line 56; the frequency on line 62 is one-fourth that of line 56; the frequency on line 64 is one-eighth the frequency on line 56; the frequency on line 66 is one-sixteenth the frequency on line 56; and the frequency on line 68 is one-thirty second the frequency on line 56.

Switch SW1 is a multi-position switch having a primary contact 70 which may engage any of secondary contacts 72, 74, 76, 78, 80 or 82. Contact 72 is connected to line 56 of the buffer stage 12 and receives the frequency of the relaxation oscillator 10. Contacts 74 is connected to line 60 and receives the frequency of the first stage of the frequency divider 16; contact 76 is connected to line 62 and receives the frequency of the second stage of the frequency divider 16, contact 78 is connected to line 64 and receives the frequency of the third stage of the frequency divider; contact 80 is connected to line 66 and receives the frequency of the fourth stage of the frequency divider; and contact 82 is connected to line 68 and receives the frequency of the fifth stage of the frequency divider. The primary contact 70 of switch SW1 is connected to the input of the phase-shift device 28. Thus switch SW1 provides selection of the frequency input to said phase-shift device.

Phase-shift device 28 is essentially a bi-stable flip-flop whose operation is essentially the same as above-described. Phase-shift device 28 comprises a first NPN transistor Q14 having its emitter connected to ground 52 and its collector connected through resistor R48 to the positive lead 50. Resistors R50 and R52 are connected to the junction between the collector of transistor Q14 and resistor R48, with their opposite ends connected across a capacitor C15. A second NPN transistor Q15 is shown having its emitter connected to ground 52 and its collector connected through resistor R49 to the positive lead 50. Resistors R51 and R53 are connected to the junction between the collector of transistor Q15 and resistor R49 with their opposite ends connected across capacitor C16. The base of transistor Q14 is connected to the junction between capacitor C16 and resistor R53, while the base of transistor Q15 is connected to the junction between capacitor C15 and resistor R52. The input from primary contact 70 of switch SW1 is connected through a first diode D12 to the junction between resistor R50 and capacitor C15 and through a second diode D13 to the junction between capacitor C16 and resistor R51. A first output point X is taken at the junction between the collector of transistor Q14 and resistors R48, R50 and R52. The second output at point Y is taken at the junction between the collector of transistor Q15 and resistors R49, R51 and R53.

Figure 2:
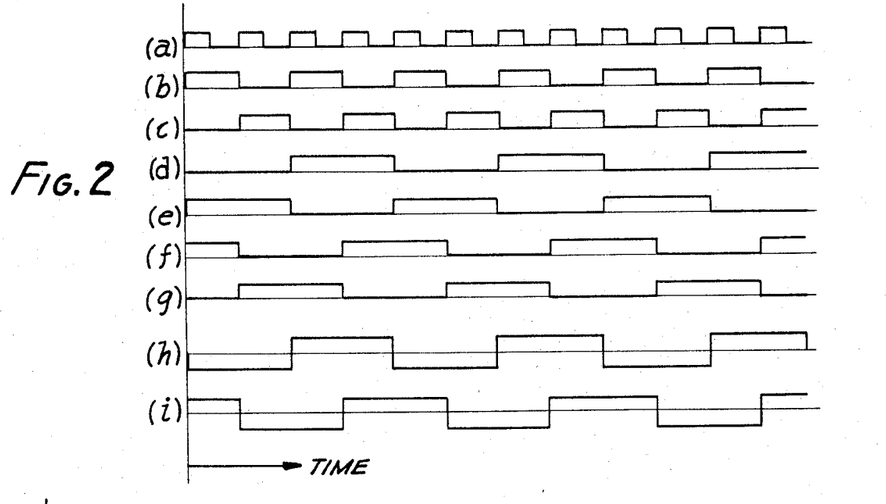
FIGS. 2a through 2i show wave forms at various points of the circuit of FIGS. 1a and 1b.

Assuming that transistor Q15 is in its on, or conducting, state and that transistor Q14 is off, or non-conducting, state, essentially the full voltage appears across transistor Q14, thus making the output point X at a high positive potential. At the same time, since transistor Q15 is in its on, or conducting, state, essentially zero voltage appears at output point Y. A positive input pulse through contact 70 shifts transistor Q14 and Q15 to their opposite states, thus producing no output at output point X and a positive output at output point Y. This is more fully explained in FIGS. 2a through 2c. FIG. 2a represents the pulse waveform introduced through contacts 70 to the phase-shift device 28. The output at point X is shown in FIG. 2b, while the output at point Y is shown in FIG. 2c. The output points X and Y are connected to the respective inputs of the output stage drivers 30 and 32.

Each output stage driver 30 and 32 is essentially the same in operation and comprises essentially a bi-stable flip-flop. Output stage driver 30 comprises a first NPN transistor Q16 having its emitter connected to ground 52 and its collector connected through resistor R54 to a first winding 84 of transformer T1. A second NPN transistor Q17 is shown having its emitter connected to ground 52 and its collector connected through resistor R55 to a second winding 86 of transformer T1. Windings 84 and 86 are shown connected together with their junction connected to the positive lead 50. Resistors R56 and R58 are connected to the junction between the collector of transistor Q16 and resistor R54. Capacitor C17 is connected to the other side of resistor R56, and resistor R59 is connected to the other side of resistor R58 and to the capacitor C17. Resistors R57 and R61 are connected to the junction between the collector of transistor Q17 and resistor R55. Capacitor C18 is connected to the opposite end of resistor R57, and resistor R60 is connected to capacitor C18 and resistor R61. The base of transistor Q16 is connected to the junction between capacitor C18 and resistor R60, while the base of transistor Q17 is connected to the junction between capacitor C17 and resistor R59. The input point X is connected through diode D14 to the junction between resistor R56 and capacitor C17 and through diode D14 to the junction between resistor R57 ans capacitor C18.

Figure 5:
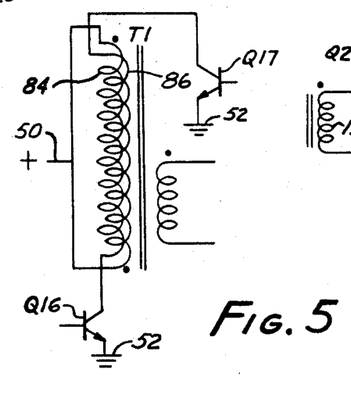
FIG. 5 shows the connections of a bi-filar transformer used in the output stage drivers in FIGS. 1a and 1b.

The function of transformer T1 is to provide an alternating square-wave current from the positive pulse input of each output stage driver. As shown more clearly in FIG. 5, windings 84 and 86 are wound in a bi-filar manner. Upon the conduction of transistor Q17, and hence the non-conduction of transistor Q16, a current in the upward direction through transformer T1 flows from lead 50 up through winding 86 through transistor Q17 to ground; while the conduction of transistor Q16, and hence the non-conduction of transistor Q17, produces a downward direction of current from line 50 through winding 84 and transistor Q17 to ground. Transistors Q16 and Q17 being in a push-pull connection of a bi-stable flip-flop, operate to produce opposite pulses upon pulsation from the output point X of the phase-shift device 28. FIG. 2b, as herebefore explained, shows the waveform at point X. FIG. 2d shows the waveform of conduction of transistor Q16, and FIG. 2e shows the waveform of conduction of transistor Q17. Due to the bi-filar winding of the primary windings 84 and 86 of transformer T1, conduction of transistor Q17 will reflect a negative voltage to the secondary of transformer T1, while conduction of transistor Q16 will produce a positive voltage on the output of transformer T1. FIG. 2h shows the output of transformer T1 as controlled by transistors Q16 and Q17.

Output stage driver 32 operates substantially identical to output stage driver 30 and comprises NPN transistors Q18 and Q19, the primary of transformer T2 having windings 88 and 90. Resistor R62 is placed between the collector of transistor Q18 and winding 88, and resistor R63 is placed between the collector of transistor Q19 and winding 90. The emitters of both transistors are connected to ground 52. The base of transistor Q18 is connected to the junction between resistors R68 and capacitor C20. Resistor R68 is connected to resistor R69, which is connected to the junction between the collector of transistor Q19 and resistor R63. Resistor R65 is connected between the junction of the collector of transistor Q19 and resistor R63 to capacitor C20. Connected to the junction between the collector of transistor Q18 and resistor R62 are resistors R64 and R66. Capacitor C19 is connected to resistor R64 and resistor R67 is connected to resistor R66. The base of transistor Q19 is connected to the junction between capacitor C19 and resistor R67. The input from point Y is connected to the junction between resistor R64 and capacitor C19 through a diode D17 and to the junction between capacitor C20 and resistor R65 through a diode D18.

Serious damage could occur to any of the windings 84, 86, 88 or 90 if their respective transistor was left in an on position; for example, when the motor is stopped. Thus a switch SW3 is provided having its primary contact connected directly to ground and its secondary contact connected by line 92 to each of the control circuits for transistors Q16, Q17, Q18 and Q19. Lead 92 is connected through a diode D20 to the junction between resistors R56 and capacitor C17, through a diode D20 to the junction between resistors R58 and R59; through a diode D21 to the junction between capacitors C18 and resistor R57; through a diode D22 to the junction between resistor R60 and R61; through a diode D23 to the junction between capacitor C19 and resistor R64; through a diode D24 to the junction between resistors R66 and R67; through a diode D25 to the junction between capacitor C20 and resistor 65; and through a diode D26 to the junction between resistors R68 and R69. Closure of switch SW3 serves to place a ground potential on lead 92, thus short-circuiting the resistors R58, R61, R66 and R69 causing the bases of transistors Q16–Q19 to follow to ground potential. The signals from points X and Y are also shorted to ground through diodes D14 and D19, D15 and D21, D17 and D23, and D18 and D25. Since each of resistors R58, R61, R66 and R69 are shorted, no signal will pass to the bases of the transistors Q16–Q19, thus all of transistors Q16, Q17, Q18 and Q19 are turned to their off, or non-conducting, state. Since each of the transistors are non-conducting, no current will flow through any of the windings 84, 86, 88 or 90, thus, an over-current condition cannot exist in any of these windings. This function also provides a low level logic turn-off of the motor because when the transistors Q16–Q19 are turned off, no signal will be supplied to the full-phase drivers 34 and 36, thus turning off the motor.

A further problem arises when first turning on the circuit. Since each of transistors Q16, Q17, Q18 and Q19 may have a slightly different characteristic, it would never be certain as to which transistor would be turned on first. Thus, to insure proper phasing sequence, a switch SW4 is provided having a primary contact 94 connected by line 100 to a point P and having secondary contacts 96 and 98. Contact 96 is connected by line 102 to the junction of resistors R58 and R59 and diode D20, and contact 98 is connected by line 104 to the junction between resistors R60 and R61 and diode D22. The primary contact 94 is connected through line 100 and diode D16 to the junction between diode D17, resistor R64 and capacitor C19 in the output stage driver 32. Thus, assuming that transistor Q17 is in its off, or non-conducting, state, and conversely transistor Q16 is in its on, or conducting, state, and that primary contact 94 is in contact with secondary contact 98, a positive pulse will be transmitted through line 108, contact 98, primary contact 94, line 100 and diode D16 to turn on transistor Q19 and cut off transistor Q18. And conversely, if transistor Q17 is on and transistor Q16 is off, but primary contact 94 is in contact with secondary contact 96, a positive pulse will appear over line 102, contact 96, primary contact 94, line 100 and diode D16, to turn on transistors Q19 and cut off transistor Q18. Thus, switch SW4 achieves a selection of proper phase sequencing of 90°, and insures positive control over the direction of shaft rotation. FIG. 2f shows the state of conduction of transistor Q18, and FIG. 2g shows the state of conduction of transistor Q19. As explained before, FIG. 2c shows the input waveform from point Y. FIG. 2i shows the waveform on the output of transformer T2. As shown in FIGS. 2h and 2i, the output of transformers T1 and T2 are 90° out of phase. This phase sequence has been selected by the switch SW4 in the aforementioned manner.

Figure 3:
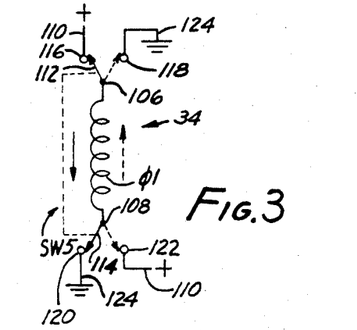
FIG. 3 shows a simplified circuit diagram of a full-phase driver.

FIG. 3 shows a simplified logic circuit of the full phase driver 34. The winding of the first phase of the motor is indicated by winding, and is connected by terminals 106 and 108 to the full phase driver 34. Switch SW5 comprises two primary contacts 112 and 114 connected to terminals 106 and 108 respectively. Secondary contact 116 is connected to a positive lead 110, and is positioned to be adapted to contact with primary contact 112. A second secondary contact 118, also adapted to be in contact with primary contact 112, is connected to negative lead 124. Secondary contact 120 is also connected to negative lead 124, and secondary contact 122 is also connected to the positive lead 110. Primary contact 114 is adapted to either connect wtih secondary contact 120 or secondary contact 122. Primary contacts 112 and 114 operate in unison on switch SW5 so that when primary contact 112 contacts secondary contact 116, primary contact 114 will contact secondary contact 120; and when primary contact 112 contacts secondary contact 118, primary contact 114 will contact secondary contact 122. When primary contact 112 is in contact with secondary contact 116 and primary contact 114 is in contact with secondary contact 120, current will flow in a downward direction through the motor winding $\phi 1$ from the positive lead 110 to the negative lead 124, and conversely, when the primary contacts 112 and 114 are in their opposite positions, that is contacting contacts 118 and 122, respectively, currently will flow in the upward direction from positive lead 110 to negative lead 124. Thus by alternating the primary contacts between their respective secondary contacts an alternating current through motor winding $\phi 1$ is attained. The frequency of this alternating current is determined by the frequency of switching the primary contacts 112 and 114 between their respective secondary contacts. It should be noted that the positive lead 110 is different from the source of DC power applied to line 50 and further different from the source of regulated voltage on line 58. Likewise, though lead 124 has been shown as grounded, in applications wherein it is desired that motor windings of the two phases not be grounded, that is a "floating ground", the only criterion is that this lead 124 be at a specified potential negative to lead 110. The derivation of voltage across leads 110 and 124 is determined by the DC-to-DC converter 38 in a manner hereinafter described.

Figure 4:
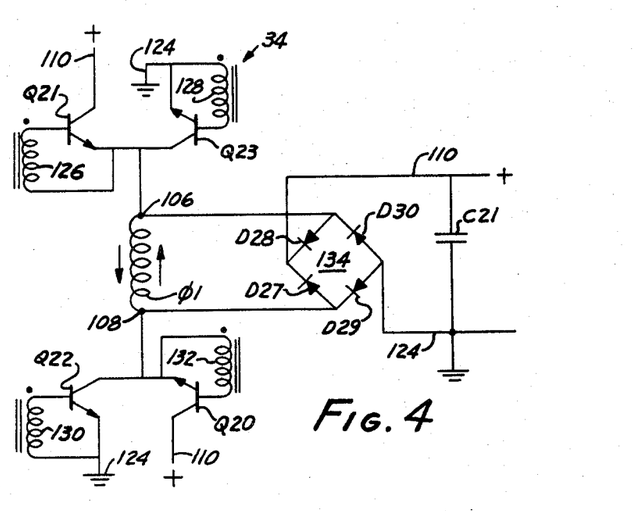
FIG. 4 shows a redrawn circuit diagram of the full-phase driver of FIGS. 1a and 1b.

The full-phase drivers 34 and 36 are shown in FIG. 1 and are shown simplified in FIG. 4. These drivers perform the alternating switching described in FIG. 3 by use of the electrical equivalents at the frequency selected by switch SW1 from the frequency divided 16.

Turning now specifically to FIG. 4, there is shown an NPN transistor Q21 having its collector connected to the positive lead 110 and its emitter connected to terminal 106. NPN transistor Q22 is shown having its collector connected to point 108 and its emitter connected to the negative or ground lead 124. NPN transistor Q23 is shown having its collector connected to terminal 106 and its emitter connected to the ground or negative lead 124. NPN transistor Q20 is shown having its emitter connected to terminal 108 and its collector connected to the positive lead 110. Thus when transistors Q21 and Q22 are in their on, or conducting, conditions, current flows through the motor winding φ1, which is connected across terminals 106 and 108, in a downward direction, in a manner similar to the condition when primary contact 112 is in contact with secondary contact 116 and primary contact 114 is in contact with secondary contact 120 in FIG. 3. Likewise when transistors Q20 and Q23 are in an on, or conducting, condition, current through the motor winding φ1 is in an upward direction similar to the condition when primary contact 112 is in contact with secondary contact 118, and primary contact 114 is in contact with secondary contact 122 in FIG. 3. As shown in FIG. 1a, the secondary of transformer T1 comprises four windings: 126, 128, 130 and 132. Winding 126 is shown connected between the base and emitter of transistor Q21, winding 128 is shown connected between the base and emitter of transistor Q23, winding 130 is shown connected between the base and emitter of transistor Q22, and winding 132 is shown connected between the base and emitter of transistor Q20. The secondary windings 126, 128, 130 and 132 are arranged in such a manner that when the primary side of transformer T1 reflects a positive signal to the secondary of transformer T1, as shown in FIG. 2h, transistors Q21 and Q22 are switched to their on, or conducting, condition. Conversely, when the primary side of transformer T1 reflects a negative signal to the secondary of transformer T1, windings 128 and 132 are wound in such a manner so as to switch transistors Q20 and Q23 into their on, or conducting, condition. Thus for each positive signal according to FIG. 2h transistors Q21 and Q22 are conducting causing current to flow in a downward direction through winding φ1, and conversely when the input is negative transistors Q20 and Q23 are conducting causing current to flow in the upward direction through winding φ1.

To elminate transients and thus to provide faster, more accurate switching, a full-wave rectifier bridge 134 is placed across the terminals 106 and 108. Diode bridge comprises diodes D27, D28, D29, and D30. Thus a positive transient appearing at terminal 106 is dissipated through diodes D28 to positive lead 110 and stored in capacitor C21. Conversely, a postive transient appearing at terminal 108 is dissipated through diode D27 to the positive lead 110 and stored in capacitor C21. Thus, for example, when transistors Q21 and Q22 are switched to their on, or conducting, condition, for example when the input from transformer T1 becomes postive, lead 110 serves to place a positive potential at terminal 106. However, transients may be developed due to the switching of transistors Q21 and Q22 which may reflect a substantially higher potential at terminal 106 that is provided for by positive lead 110. This transient is dissipated through diode D28 back to the lead 110. Although it is possible to dissipate this transient to ground, it is desirable to store it in capacitor C21 to conserve energy. As will be pointed out hereinafter, capacitor C21 serves to store the energy necessary to drive the motor windings φ1 and φ2.

Full-phase driver 36 comprises NPN transistors Q24 and Q25 having their collectors connected to the positive lead 110 and transistors Q26 and Q27 having their emitters connected to the ground or negative lead 124. The emitter of transistor Q24 and the collector of transistors Q26 are connected to a terminal 144, and the emitter of transistor Q25 and the collector of transistor Q27 are connected to a terminal 146. The motor winding for the second phase of the motor is connected across terminals 144 and 146. The secondary of transformer T2 comprises a winding 136 connected across the base and emitter of transistor Q25, a winding 138 connected across the base and emitter of transistor Q27, a winding 140 connected across the base and emitter of transistor Q26, and a winding 142 connected across the base and emitter of transistor Q24. A diode bridge 148 comprising diodes D31, D32, D33 and D34 is connected across terminals 144 and 146 in a manner similar to that shown in the full-phase driver 34. Thus a positive transient appearing at terminal 144 is dissipated through diode D31 to the positive lead 110, and a positive transient apearing at terminal 146 is dissipated through diode D32 to the positive lead 110. These transients are stored in capacitor C21 in the manner described in FIG. 4.

As pointed out above, the speed selection for the motor is performed by changing the frequency on each phase of the motor windings and by changing the voltage across the windings in a substantially linear proportion with the change of frequency. The frequency selection is performed by the frequency divider 16, the phase-shift device 28, the output stage drivers 30 and 32, and the full-phase drivers 34 and 36 in the manner herebefore described. The voltage selection is performed by the DC-to-DC converter 38.

DC-to-DC converter 38 receives its input from the supply across lines 50 and 52 and impresses the selected DC output across lines 110 and 124. The converter comprises a saturable-core transformer T3 having a pair of windings 150 and 152 connected to the positive lead 50 from the supply. An NPN transistor Q28 is connected with its collector to winding 150 and its emitter to ground 52, and NPN transistor Q29 is connected with its collector to winding 152 and its emitter to ground 52. Resistors R70 and R71 are serially connected across the supply voltage in a voltage-divider manner. The base of transistor Q28 is connected through a winding 154 of saturable-core transformer T3 to the junction between resistors R70 and R71, while the base of transistor Q29 is connected through winding 156 of saturable-core transformer T3 to the junction between resistors R70 and R71. Transistors Q28 and Q29 are connected in a push-pull manner so as to generate an alternating current through winding 152 of the saturable-core transformer T3. Winding 152 serves as a primary winding for winding 158 of the saturable-core transformer T3.

Voltage selection is provided by switch SW2, having primary contact 160 and secondary contacts 162, 164, 166, 168, 170 and 172. The secondary contacts 162–172 are connected to various taps along winding 158 of saturable-core transformer T3, and are equal in number to the number of secondary contacts of switch SW1. The primary contact 160 of switch SW2 moves in unison with the primary contact 70 of switch SW1. Switches SW1 and SW2 are thus ganged. A lead 174 connects primary contact 160 to one side of a diode rectifier bridge 176. A lead 178 connects one side of the winding 158 of saturable-core transformer T3 to the opposite side of the bridge 176. Diode bridge 176 comprises diodes D35, D36, D37 and D38 and serves to rectify the alternating current appearing across winding 158 of saturable-core transformer T3 to a direct current potenial. Lead 110 is connected to diode bridge 176 to form the positive side of the DC potential, and lead 124 is connected to the diode bridge 176 to form the negative potential of DC. Capacitor C21 is connected across the leads 110 and 124 to smooth the DC potential across lines 110 and 124. Lead 124 may be grounded as desired, and in applications wherein it is desired that the motor winding leads not be grounded, the ground on lead 124 may be eliminated.

It is thus seen that alteration of the frequency by switch SW1 will also alter the voltage on line 110 via switch SW2. The voltage on lead 110 is stored in capacitor C21 and is used for driving the full-phase drivers 34 and 36.

Although the preferred embodiment has been described as having a selection between a plurality of predetermined speeds, it is understood that the number of speeds selectable could be any number. The frequency of the relaxation oscillator can be changed by altering the R-C time constant of resistor R3 and capacitor C2. By providing a variable adjustment of the R-C time constant, and at the same time varying the voltage on winding 158 of saturable-core transformer T3, for example with a variable transformer, an infinite number of speeds can be obtained.

A bi-filar motor drive may be used with the above-described system. If such a motor drive is used, transformers T1 and T2 are removed along with the full-phase drivers 34 and 36. Each winding of the bi-filar winding of the motor replaces the primary windings of the transformers T1 and T2 and are returned to the potential level at lead 110. This system conserves space, and in installations where space requirements are critical, but performance and accuracy of speed selection may be sacrificed, such a bi-filar motor connection may be used.

Several motors may be separately driven by the apparatus of this invention by providing a common relaxation oscillator 10 and frequency divider 16. Likewise a common DC-to-DC converter 38 is provided. Thus, by providing each motor with its own phase-shift device 28, output stage drivers 30 and 32, and full-phase drivers 34 and 36, and by providing separate primary contacts 70 and 160 for each motor for switches SW1 and SW2, respectively, the frequency and voltage selection may be performed separately for each motor off of the common secondary contacts for switches SW1 and SW2.

The following list of components is set forth as illustrative of the components which may be used:

Transistors:
```
Q1 ------------------------------ 2N1671A
Q2 ------------------------------ 2N651A
Q3, Q16-Q19 --------------------- 2N1613
Q14-Q15 ------------------------- 2N3394
Q20-Q29 ------------------------- 2N3771
```
Diodes:
```
D1 ------------------------------ 1N1199A
D2-D26 -------------------------- 1N458A
D27-D34 ------------------------- 1N4001
Z1 ------------------------------ 1N965B
Z2 ------------------------------ 1N968B
Transformers T1, T2 ------- Gaylord-Rives 50058
Saturable-Core Transformer T3
                           Gaylord-Rives 50099
```
Capacitors                                     Mfd.
```
C1, C4, 15 v. ---------------------------- 3.3
C2, 100 v. ------------------------------- 0.02
C3, 10 v. -------------------------------- 0.05
C5-C14, 100 v. --------------------------- 0.001
C15-C20 100 v. --------------------------- 0.0022
C21, 50 v. ------------------------------- 500
```
Resistors:                         Resistance in ohms
```
R1 ---------------------------------- 910
R2 ---------------------------------- 330
R3 (approximately) ------------------ 10K
Rr, R5, R7 -------------------------- 1000
R6, R11, R14, R19, R22, R27 --------- 3900
R30, R35, R38, R43, R46, R48 -------- 3900
R49, R58-R61, R66-R-69 -------------- 3900
R8, R15, R16, R23, R24, R31, R32 ---- 10K
R40, R47 ---------------------------- 10K
R9, R12, R13, R17, R20, R21, R25 ---- 100K
R28, R29, R33, R36, R37, R41, R44, R45 -- 100K
R10, R18, R26, R34, R42, R50, R51 --- 82K
R52, R53, R56, R57, R64, R65 -------- 33K
R54, R55, R62, R63, R71 ------------- 100
R70 --------------------------------- 2000
Diode Bridge 176 (D35-D38) ----- Varo 1N4436
```

A parallel combination of a resistor and a capacitor may be connected between each of point X and point Y and ground for filtering the outputs from the phase-shift device 28. For illustrative purposes, each of these capacitors C22, C23 may be 0.0022 mfd., 100 v. and each resistor R72, R73 may be 10K ohms.

A circuit was constructed with the above values, and with a DC supply of between 24 to 32 volts, the frequencies supplied were 6400 c.p.s. at contact 72; 3200 c.p.s. at contact 74; 1600 c.p.s. at contact 76; 800 c.p.s. at contact 78; 400 c.p.s. at contact 80; and 200 c.p.s. at contact 82. When primary contact 160 contacted secondary contact 162, the voltage on line 110 was approximately 48 v.; approximately 26 v. when at contact 164; approximately 16 v. when at contact 166; approximately 9 v. when at contact 168; approximately 6 v. when at contact 170; and approximately 4 v. when at contact 172.

It should be understood that numerous other modifications may be made to the preferred form of the invention above described, without deviating from the broader aspects of the invention. PNP transistors may be used instead of NPN transistors, and conversely NPN transistors may be used instead of PNP transistors. Likewise, circuits using silicon controlled rectifiers, silicon controlled switches, or other applicable solid state devices may be used instead of transistors. In addition, this invention may be performed by use of vacuum tube switches, vacuum tube diodes, relays, integrated circuits, or magnetic cores. It should be noted that the manual switches, though shown as manual switches, may be electronic switches, for example, transistors, relays, vacuum tubes, magnetic cores, or any of the silicon controlled devices.

This invention is not to be limited by the embodiment shown in the drawings and described in the description which is given by way of example and not of limitation, but only in accordance with the scope of the appended claims.

We claim:

1. A control for providing a plurality of selectible speeds of rotation for an A.C. motor having a winding, said control comprising; a source of potential having a plurality of levels of potential; a source of pulsating current having a plurality of frequencies, each frequency being respective to an individual level of said source of potential; selection means connected to said source of potential and to said source of pulsating current for concurrently selecting one of said plurality of levels of potential and a respective frequency of pulsating current; inverter means connected to said selection means to invert the selected one of said levels of potential at a frequency dependent upon the selected frequency of said source of pulsating current; and output means adapted to connect said inverter means to the winding of said motor.

2. A control according to claim 1 including a source of direct current, said source of potential comprising a DC-to-AC converter having its input connect to said source of direct current and having an output, a transformer having at least one primary winding connected to the output of said DC-to-AC converter and having a secondary winding, a plurality of taps connected to said secondary winding, said selection means for selected one of said plurality of levels of potential includes a switch having a primary contact and a plurality of secondary contacts, each of said plurality of taps being connected to one of said plurality of secondary contacts, and an AC-to-DC converter connected to said primary contact.

3. A control according to claim 1 including a source of direct current, said source of variable frequency pulsating current comprises an oscillator having an input connected to said source of direct current and having an output and capable of providing a first signal having a first frequency, a frequency divider having an input and a plurality of outputs, each of said outputs of said frequency divider being capable of providing a second signal having a different frequency related to said first frequency, and means connecting the output of said oscillator to the input of said frequency divider.

4. A control according to claim 1 wherein said output means is adapted to connect said inverter means to a multi-phase motor having a winding for each phase, said inverter means comprises means connected to said selection means to receive the selected one of said frequencies of pulsating current and to provide a separate signal for each phase of said multi-phase motor, each of said separate signals being at a substantially identical frequency in separate phase relationship, and a plurality of driver means, one for each phase of said multi-phase motor and each capable of receiving one of said separate signals, to invert the selected one of said levels of potential at the frequency of said separate signal, and said output means comprises means adapted to connect each of said driver means to a corresponding winding of said multi-phase motor.

5. A control according to claim 4 including a source of direct current, said source of potential comprising a DC-to-AC converter having its input connected to said source of direct current and having an output, a transformer having at least one primary winding connected to the output of said DC-to-AC converter and having a secondary winding, a plurality of taps connected to said secondary winding, said selection means for selecting one of said plurality of levels of potential includes a switch having a primary contact and a plurality of secondary contacts, each of said plurality of taps being connected to one of said plurality of secondary contacts, and an AC-to-DC converted connected to said primary contact.

6. A control according to claim 4 including a source of direct current, said source of variable frequency pulsating current comprises an oscillator having an input connected to said source of direct current and having an output and capable of providing a first signal having a first frequency, a frequency divider having an input and a plurality of outputs, each of said outputs of said frequency divider being capable of providing a second signal having a different frequency related to said first frequency, and means connecting the output of said oscillator to the input of said frequency divider.

7. A control for providing a plurality of selectable speeds of rotation for a two-phase A.C. motor having two windings, one for each phase, said control comprising: a source of potential having a plurality of levels of potential; a source of variable frequency pulsating current, each frequency being respective to an individual level of said source of potential; selection means for concurrently selecting one of said plurality of levels of potential and a respective frequency of pulsating current; inverter means connected to said selection means to invert the selected one of said levels of potential at a frequency dependent upon the selected frequency of said source of pulsating current; and first and second output means adapted to connect said inverter means to the windings of said motor, said inverter means comprising a phase-shift means having two output signals, said output signals from said phase-shift means being 180° out of phase from each other, first stage driver means having an input connected to a first one of said output signals from said phase-shift means and having an output, a first transformer having a primary winding connected to the output of said first stage driver means and having a secondary winding, second stage driver means having an input connected to a second one of said output signals from said phase-shift means and having an output, a second transformer having a primary winding connected to the output of said second stage driver means and having a secondary winding, said first stage driver means producing a first alternating signal and said second stage driver means producing a second alternating signal 90° out of phase from said first alternating signal, a first switch means and a second switch means each connected to said first output means and to said selected one of said levels of potential, and means for connecting said first and second switch means to the secondary winding of said first transformer whereby said first and second switch means alternately conduct at the frequency of said first alternating signal, a third switch means and a fourth switch means each connected to said second output means and to said selected one of said source of potential, and means connecting said third and fourth switch means to the secondary winding of said second transformer whereby said third and fourth switch means alternately conduct at the frequency of said second alternating signal.

8. A control according to claim 7 including a source of direct current, said source of potential comprising a DC-to-AC converter having its input connected to said source of direct current and having an output, a transformer having at least one primary winding connected to the output of said DC-to-AC converter and having a secondary winding, a plurality of taps connected to said secondary winding, said selection means for selecting one of said plurality of levels of potential includes a switch having a primary contact and a plurality of secondary contacts, each of said plurality of taps being connected to one of said plurality of secondary contacts, and an AC-to-DC converter connected to said primary contact.

9. A control according to claim 8 wherein said source of variable frequency pulsating current comprises an oscillator having an input connected to said source of direct current and having an output and capable of providing a first signal having a first frequency, a frequency divider having an input and a plurality of outputs, each of said outputs of said frequency divider being capable of providing a second signal having a different frequency related to said first frequency, and means connecting the output of said oscillator to the input of said frequency divider.

10. A control according to claim 9 including additional switch means to selectively connect said first stage driver to said second stage driver to provide that said first alternating signal will selectively lead or lag said second alternating signal.

11. A control according to claim 9 including switch means to selectively connect said first stage driver to said second stage driver to provide that said first alternating signal will selectively lead or lag said second alternating signal by 90°.

12. A control according to claim 11 wherein said first and second stage drivers each comprise a bi-stable flip-flop, each of said bi-stable flip-flops having a pair of switches connected in a push-pull manner whereby when one of said pair of switches is conducting the other of said pair of switches is non-conducted, the primary winding of each of said first and second transformers comprises two windings wound in a bi-filar manner and connected to said pair of switches whereby conduction of one of said pair of switches causes current to flow through one of said primary windings and conduction of the other of said pair of switches causes current to flow in the other of said primary windings.

13. A control according to claim 12 wherein each of said pair of switches is an electronic switch having a control electrode, and means connected to the control electrodes of each of said electronic switches to predeterminedly prevent operation of said electronic switches.

14. The method of selecting the speed of rotation of a motor having a plurality of windings comprising the steps of:
 (a) selecting from a plurality of sources of different potential one of said potentials;
 (b) selecting from a plurality of different sources of pulsating current, each being respective to an individual one of said plurality of sources of potential, a current having a predetermined frequency;
 (c) deriving from the selected source of pulsating current a first pair of pulsating signals 180° out of phase;

(d) deriving from one of said first pair of pulsating signals a second pair of pulsating signals 180° out of phase and at one-half the frequency of said first pair of pulsating signals;

(e) deriving from the other of said first pair of pulsating signals a third pair of pulsating signals 180° out of phase and at one-half the frequency of said other of said first pair of pulsating signals;

(f) deriving a first alternating current from said second pair of pulsating signals;

(g) deriving a second alternating current 90° out of phase from said first alternating current from said third pair of pulsating signals;

(h) inverting the selected one of said sources of potential at the frequency of said first alternating current to obtain a first resultant signal;

(i) inverting the selected one of said source of potential at the frequency of said second alternating current to obtain a second resultant signal;

(j) impressing the first resultant signal on a first winding of the motor; and (k) impressing the second resultant signal on a second winding of the motor.

15. The method according to claim 14 including between steps (g) and (h) the step of:

(1) selectively controlling whether said second alternating current leads or lags said first alternating current.

References Cited

UNITED STATES PATENTS

| | | | |
|---|---|---|---|
| 2,784,365 | 3/1957 | Fenemore et al. | 318—230 |
| 3,105,180 | 9/1963 | Burnett | 318—231 XR |
| 3,289,062 | 11/1966 | Dannettell | 318—227 XR |
| 3,343,063 | 9/1967 | Keeny, et al. | 381—230 XR |
| 3,344,326 | 9/1967 | Risberg | 318—231 XR |
| 3,351,835 | 11/1967 | Borden et al. | 318—227 |

ORIS L. RADER, *Primary Examiner.*

G. RUBINSON, *Assistant Examiner.*

U.S. Cl. X.R.

318—138, 171, 230, 231

UNITED STATES PATENT OFFICE
CERTIFICATE OF CORRECTION

Patent No. 3,416,057                                  December 10, 1968

Stanley G. Froyd et al.

It is certified that error appears in the above identified patent and that said Letters Patent are hereby corrected as shown below:

Column 3, line 32, "shownn" should read -- shown --; line 64, "prefarably" should read -- preferably --; line 71, "invert should read -- inverters --. Column 4, line 35, "flip-flop" should read -- flip-flops --; line 40, after "Flip-flop" insert -- 18 --. Column 5, lines 43 and 44, "one-thirty second" shoul read -- one-thirtysecond --; line 49, "contacts" should read -- contact --. Column 6, line 26, "contacts" should read -- conta --. Column 7, line 38, "D20" should read -- D19 --. Column 8, line 29, after "winding" insert -- φ --; line 75, "divided" should read -- divider --. Column 9, line 73, "transistors" should read -- transistor --. Column 12, line 57, "connect" should read -- connected --.

Signed and sealed this 17th day of March 1970.

(SEAL)
Attest:

EDWARD M. FLETCHER, JR.
Attesting Officer

WILLIAM E. SCHUYLER, JR.
Commissioner of Patents